(12) United States Patent
Mahajan et al.

(10) Patent No.: US 8,825,737 B2
(45) Date of Patent: Sep. 2, 2014

(54) PER-APPLICATION REMOTE VOLUME CONTROL

(75) Inventors: Rajneesh Mahajan, Bellevue, WA (US); Vladimir Stoyanov, Redmond, WA (US); Nelly Porter, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1306 days.

(21) Appl. No.: 11/685,922

(22) Filed: Mar. 14, 2007

(65) Prior Publication Data

US 2008/0189355 A1    Aug. 7, 2008

Related U.S. Application Data

(60) Provisional application No. 60/888,659, filed on Feb. 7, 2007.

(51) Int. Cl.
*G06F 15/16* (2006.01)
*H04L 29/06* (2006.01)
*H04L 29/08* (2006.01)

(52) U.S. Cl.
CPC .......... *H04L 67/125* (2013.01); *H04L 65/4092* (2013.01); *H04L 65/4069* (2013.01)
USPC ...................................................... 709/203

(58) Field of Classification Search
CPC .............. H04L 65/4069; H04L 67/125; H04L 65/4092
USPC ...................................................... 709/203
See application file for complete search history.

(56) References Cited

U.S. PATENT DOCUMENTS

| | | | |
|---|---|---|---|
| 4,550,400 A | | 10/1985 | Henderson, Jr. et al. |
| 5,402,499 A | | 3/1995 | Robison et al. |
| 5,574,934 A | * | 11/1996 | Mirashrafi et al. ............ 709/207 |
| 6,396,419 B1 | | 5/2002 | Yeh |
| 6,681,310 B1 | | 1/2004 | Kusters et al. |
| 6,819,961 B2 | | 11/2004 | Jacobs et al. |
| 7,085,710 B1 | | 8/2006 | Beckert et al. |
| 2003/0139931 A1 | | 7/2003 | Park |
| 2004/0005067 A1 | | 1/2004 | Aiso et al. |
| 2004/0052385 A1 | | 3/2004 | Lim et al. |

(Continued)

FOREIGN PATENT DOCUMENTS

WO    WO20072589 A1    11/2000

OTHER PUBLICATIONS

"OfficeOne Volume Control 1.1", retrieved on Feb. 6, 2006, at <<http://web.archive.org/web/20060206085404/http://officeone.mvps.org/volctrl/volctrl.html>>, OfficeOne, 2001-2006, pp. 01.*

(Continued)

*Primary Examiner* — Maceeh Anwari
(74) *Attorney, Agent, or Firm* — Jim Sfekas; Kate Drakos; Micky Minhas

(57) ABSTRACT

In client-server architectures, systems and methods for per-application remote volume control are disclosed. In an implementation, one or more audio session are created between a client computing device and a server computing device corresponding to one or more media applications running on the server computing device. The volume of each of the media application is selectively changed at the server and the change in volume is synchronized at the client for the corresponding audio session.

20 Claims, 6 Drawing Sheets

(56) References Cited

U.S. PATENT DOCUMENTS

| | | | |
|---|---|---|---|
| 2005/0043831 A1* | 2/2005 | Baudisch | 700/94 |
| 2005/0111675 A1 | 5/2005 | Lee | |
| 2006/0098591 A1* | 5/2006 | Katou | 370/260 |
| 2006/0171515 A1* | 8/2006 | Hintermeister et al. | 379/110.01 |
| 2009/0193138 A1* | 7/2009 | Capps | 709/231 |

OTHER PUBLICATIONS

Kline, et al., "Improving GUI Accessibility for People with Low Vision", retrieved on Oct. 20, 2006 at <<http://www.sigchi.org/chi95/Electronic/documnts/papers/rlk_bdy.htm>>, CHI'95 Proceedings, ACM, pp. 1-11.

Kumar, "A Review of Smart Volume Controllers for Consumer Electronics", retrieved at <<http://ieeexplore.ieee.org/iel5/30/31480/01468006.pdf?arnumber=1468006&htry=2>>, IEEE Transactions on Consumer Electronics, vol. 51, No. 2, May 2005, IEEE, 2005, pp. 600-605.

"OfficeOne Volume Control 1.1", retrieved on Oct. 20, 2006, at <<http://officeone.mvps.org/volctrl/volctrl.html>>, OfficeOne, 2001-2006, pp. 01.

* cited by examiner

PER-APPLICATION REMOTE VOLUME CONTROL

RELATED APPLICATIONS

The present application claims priority under 35 U.S.C. §119(e) to U.S. Provisional Application No. 60/888,659 filed Feb. 7, 2007, the disclosure of which is incorporated herein.

BACKGROUND

In typical server-client computer architectures/systems, a client computing device (client) may execute applications hosted on the server computing device (server). Such applications may include media specific applications or media applications that provide audio. During execution of such media applications, it may be desired to establish a control mechanism at the client, such that the client may implement control over the media applications executed at the server. In certain cases, multiple media applications may be executed simultaneously on the server and a single audio stream is presented to the client.

Typical systems and methods provide for a single mixed volume control on the client device to control volume of the single audio stream. The client can control a mixed volume which applies to all media applications and not selectively to each of the media applications; however, it may be desirable to establish individual volume control for each of the applications being executed at the server.

SUMMARY

This summary is provided to introduce simplified concepts of per-application remote volume control, which is further described below in the Detailed Description. This summary is not intended to identify essential features of the claimed subject matter, nor is it intended for use in determining the scope of the claimed subject matter.

In an embodiment, an application is initiated at a server and an audio session is instantiated. A client is notified of the audio session, and an audio session is created at the client, where a volume control is provided for control of individual applications.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

It may be desirable for a remote client computing device (client) to selectively control volume of multiple media applications running on a server computing device (server). To this end, the disclosed systems and methods enable per-application volume control for one or more media applications that are executed on the server. Execution of the media applications on the server may result in an audio stream which is intercepted by the client device. The disclosed methods may synchronize the volume of the audio stream at the client device with that of the one or more media applications running on the server. In an implementation, an interactive user interface may be presented on the client device to enable per-application volume control by means of volume sliders. A seamless control for remote media application may be provided to a user of the client device.

The following disclosure describes systems and methods for per-application remote volume control. While aspects of described systems and methods for per-application remote volume control can be implemented in any number of different computing systems, environments, and/or configurations, embodiments of the systems and methods are described in the context of the following exemplary system architecture(s).

Exemplary System

Figure 1:
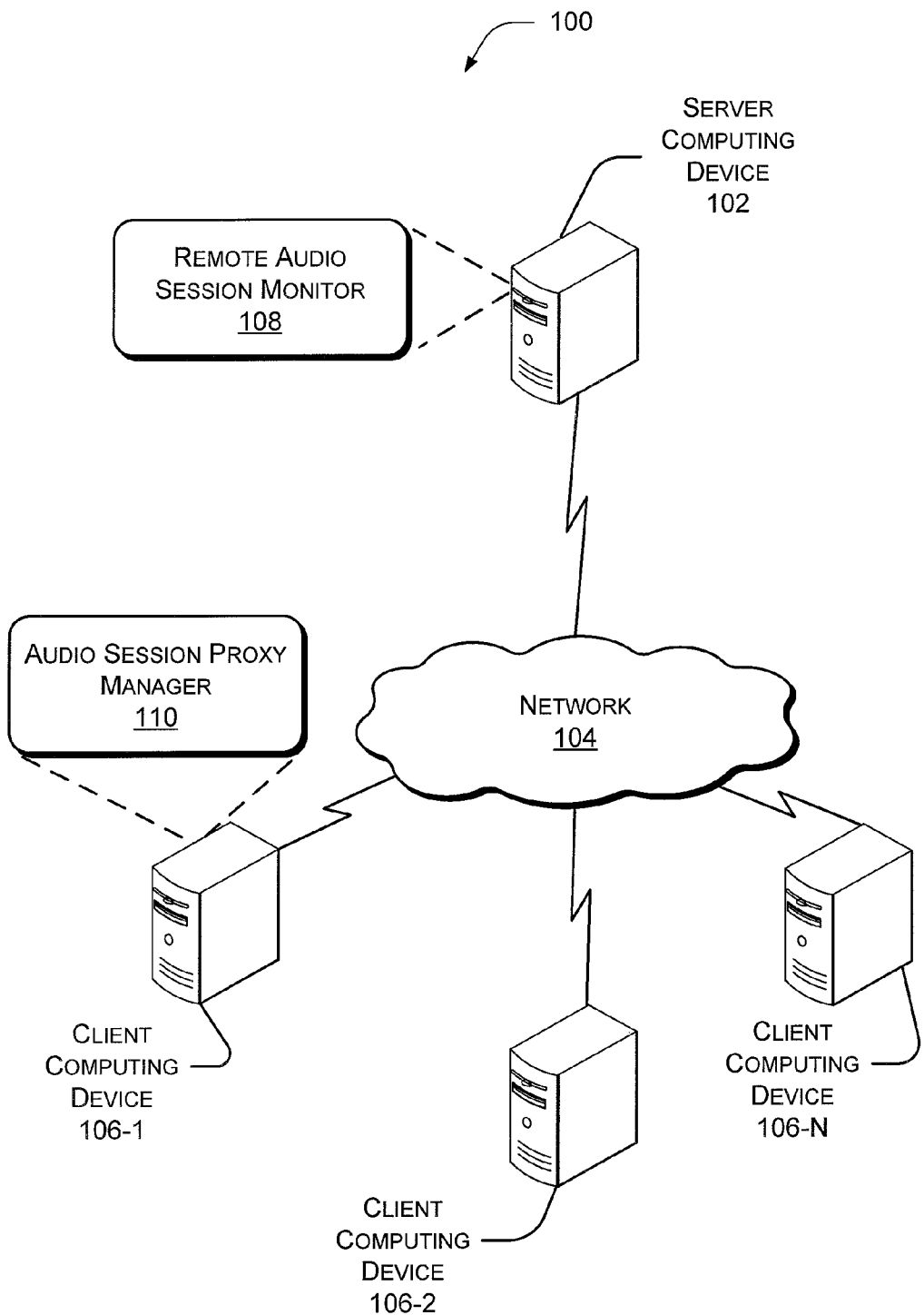
FIG. 1 is an illustration of an exemplary remote client access system implementing per-application remote volume control in a client-server computing environment.

FIG. 1 shows an exemplary remote client access system 100 for per-application remote volume control. To this end, the system 100 includes a server computing device or server 102 communicating through a network 104 with one or more client computing devices or clients 106-1, 106-2, . . . , 106-N. The system 100 may be a Terminal Service™ system as provided or defined by the Microsoft Corporation, where the clients 106 rely on applications which are executed on the server 102. Such applications may provide functionality, and particularly include one or more media applications that incorporate audio.

The server 102 maybe implemented with an operating system (e.g. Windows Vista®) provided by the Microsoft Corporation. The server 102 and the clients 106 may implement a communication protocol such as remote desktop protocol (RDP), in order to pass data or information (i.e., communicate) with one another. The use of such communication protocols, and particularly RDP, may be implemented in the context of a remote client access system such as a Terminal Services™ system.

The server 102 may be implemented as any of a variety of conventional computing devices, including, for example, a desktop PC, a notebook or portable computer, a workstation, a mainframe computer, a mobile computing device, an entertainment device, a game console, a set-top box, a DVD player, an Internet appliance, etc. that may be configured to provide streaming media content. The server 102 may also include one or more of the aforementioned conventional computing devices configured as a server in a server-client computing environment.

The clients 106 may be a general-purpose PC (personal computer), a laptop PC, a tablet PC, or the like, and may implement an operating system such as a Windows® brand operating system (e.g. Windows Vista®) from Microsoft Corporation. The clients 106 may be a standalone computer that primarily interfaces with the server 102 to access files or other information (e.g., application programs resident at the server computing device 102) that are not locally stored at the client 106.

The network 104 may be a wireless or a wired network, or a combination thereof. The network 104 may also be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof. Moreover, the network 104 connecting the server 102 and clients 106 may implement a transport protocol such as transmission control protocol over Internet protocol (TCP/IP).

The server 102 may host one or more media applications which are accessed or executed by the clients 106. Such media applications may include, for example, Windows Media Player, Media Center, VLC Media Player, Winamp Player, DivX Player, Real Player, DSS Player, and other similar Media players. Execution of the media applications results in one or more remote audio sessions between the server 102 and the clients 106. In an implementation, the server 102 implements a remote audio session monitor 108 to manage remote audio sessions.

The remote audio session monitor 108 registers various local audio session notifications from the media applications executed on the server 102. Such local audio session notifications may include, for example, creating new local audio sessions, volume changes, and local audio session title changes. In an exemplary implementation, the remote audio session monitor 108 utilizes an API (application program interface) exposed by an audio stack in the server 102. The audio stack may be subsystem of an operating system in the server 102. Volume change notifications (e.g. change in volume of the media application) in the server 102 are a result of a change of state of one or more variables in the audio stack. Responsive to such a change in the one or more variables, the audio stack may fire a local audio session notification to indicate a change in volume.

For purposes of exemplary illustration, an audio stack in the server 102 is referred to as a server audio stack and further described below. Accordingly, the remote audio session monitor 108 receives local audio session notifications from the server audio stack and gathers required information for a remote audio session. The gathered information is sent as a remote audio session notification to an audio session proxy manager 110 as implemented by example in the client 106-1. Other clients 106 may implement audio session proxy manager such as the audio session proxy manager 110.

In this example, the audio session proxy manager 110 receives the remote audio session notifications from the remote audio session monitor 108. The audio session proxy manager 110 utilizes the remote audio session notifications to create a proxy audio session at the client 106-1. Remote audio session notifications corresponding to a change in volume of one or more media applications in the server 102 may be communicated to the audio session proxy manager 110 in the client 106-1. The audio session proxy manager 110 acts upon such a remote audio session notifications to reflect a corresponding change in volume at the client device 106-1. The change in volume may be reflected by a new state in one or more variables of a client audio stack in the client 106-1. A new local audio session at the client 106-1 is created based on the remote audio session notification, which acts as a proxy for the remote audio session. The creation of the new local audio session is notified to the client 106-1. Upon creation of such a local audio session, a volume slider may be presented at the client 106-1. The volume slider may be utilized by a user of the client 106-1 to increase or decrease the volume of the media application running on the server 102.

In certain situations, there may be multiple media applications running concurrently, or executed simultaneously, on the server 102. In such situations, the remote audio session monitor 108 notifies the audio session proxy manager 110 about any changes in volume of individual media applications at the server 102. The change in volume, if any, is reflected as a change of state of one or more of variables in server audio stack and corresponding notifications are sent to the remote audio session monitor 108. Accordingly, a remote volume change notification may be sent by the remote audio session monitor 108 to the audio session proxy manager 110. The audio session proxy manager 110 receives and applies the volume change on the proxy audio session in the client audio stack. The volume changes are acted upon by the volume sliders whose position is changed to reflect a change in the volume of the respective media applications running on the server 102. In an alternative embodiment, a user may utilize a user interface on the client 106-1 to remotely control the volume of the one or more media applications running on the server 102. The user interface provides for one or more volume sliders to control per-application volume of respective media applications executed at the server 102. The user changes the volume of one or more media applications by sliding the volume sliders for the corresponding application. Such a change in the volume is implemented on the client 106-1 and results in a change of state of one or more variables stored in the client audio stack. The volume change reflected in the client audio stack is notified to the audio session proxy manager 110. The audio session proxy manager 110 determines whether the volume change is applicable to a local audio session at the client 106-1 or to a remote audio session.

In a case when the volume change is applicable to a remote audio session, the audio session proxy manager 110 sends a volume update to the server 102. The server 102 receives the remote volume change notification and applies the volume change to a media application to which the change is applicable. The remote audio session monitor 108 accomplishes this by changing the state of one or more variables in the server audio stack. The change in the state of one or more variables may be reflected in the corresponding media application thereafter.

In yet another implementation, the one or more variables in the audio stack (in server 102 or client 106) may include audio session parameters. Accordingly, the remote audio session monitor 108 and the audio session proxy manager 110 enable synchronization of audio session parameters between the server 102 and the client 106-1. Audio session parameters may include, for example, the volume, a title, changes in volume and title, an audio file extension, icon for visual display, and compression standards, etc associated with a media application running at the server 102. It may be appreciated that the above description may be applied to the one or more clients 106-2, . . . , 106-N to remotely control per-application volume of one or more media applications running at the server 102.

Exemplary Server Computing Device

Figure 2:
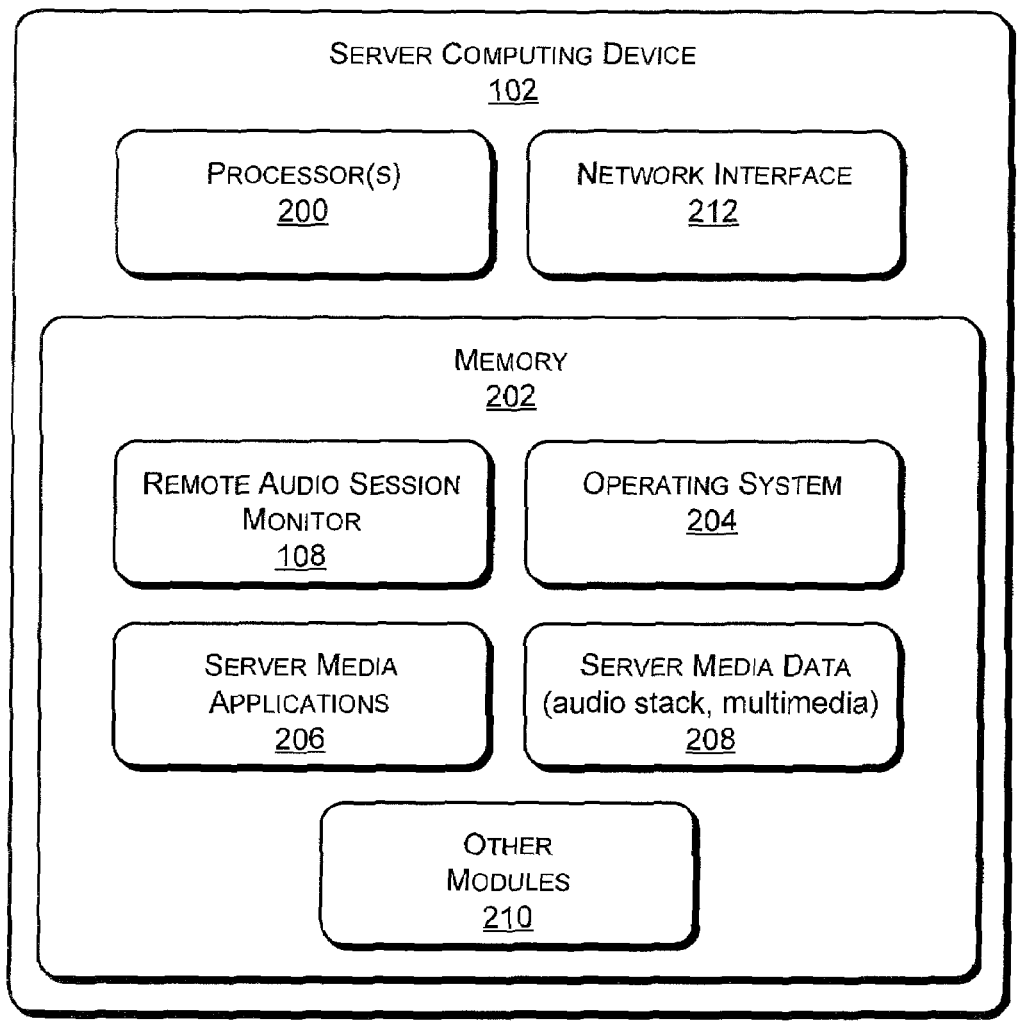
FIG. 2 is an implementation of a server computing device for per-application remote volume control.

FIG. 2 shows an implementation of the server 102 for per-application remote volume control. The server 102 includes one or more processor(s) 200 coupled to a memory 202. Such processor(s) 200 could be for example, microprocessors, microcomputers, microcontrollers, digital signal processors, central processing units, state machines, logic circuitries, and/or any devices that manipulate data based on operational instructions. The processor(s) 200 are configured to fetch and execute computer-program instructions stored in the memory 202. Memory 202 includes computer-readable media in the form of volatile memory, such as Random Access Memory (RAM) and/or non-volatile memory, such as Read Only Memory (ROM) or flash RAM or a combination thereof.

The memory 202 may include operating system 204 that provides a platform for execution of one or more applications on the server 102. The memory 202 may also include one or more server media applications 206 that include, for example, Windows Media Player, Media Center, VLC Media Player, Winamp Player, DivX Player, Real Player, DSS Player, etc. The server media application 206 may be executed upon receiving a request from one or more clients 106. In typical server-client architecture, the server 102 functions as an application server where the clients 106 rely on applications, which execute on the server 102 for all or certain application programs that provide functionality, and particularly access and control of one or more server media applications 206. Execution of the server media applications 206 instantiates one or more audio session between the server 102 and the clients 106. The server 102 implements a remote audio session monitor 108 to send remote audio session notifications corresponding to server media applications 206.

In an exemplary implementation, the remote audio session monitor 108 is configured to register for one or more local audio session notifications from the server media applications 206 executed on the server 102. Such local audio session notifications may include, for example, creating new audio sessions, volume changes, and audio session title changes. A server audio stack stored in server media data 208 keeps a record of a state of various audio session parameters associated with the server media application 206. It may be appreciated that the audio stack may be realized as any suitable data structure for documenting the audio session notifications. Alternatively, the audio stack may be implemented as a sub-system of the operating system 204.

For example, when a client 106 provides a request to execute the server media application 206 on the server 102, a new local audio session is created. A local audio session notification is fired by the server audio stack and states of various audio session parameters corresponding to the new local audio session are stored. Subsequently, the remote audio session monitor 108 receives the local audio session notification from the server audio stack and sends a remote audio session notification to the client 106.

In the example above, the audio session proxy manager 110 receives the remote audio session notification for the new audio session instantiated by the client 106. In such an implementation, the remote audio session monitor 108 and the audio session proxy manager 110 enable synchronization of audio session parameters between the server 102 and the client 106.

In yet another implementation, a change in volume of a server media application 206 may be communicated to the client 106-1. To this end, the remote audio session monitor 108 receives a local volume change notification associated with the server media application 206 from the server audio stack. Furthermore, the remote audio session monitor 108 also gathers required information for the corresponding audio session. The gathered information is forwarded as a remote volume change notification to the audio session proxy manager 110 implemented in the client 106.

In an alternative embodiment, the remote audio session monitor 108 may also be configured to receive a volume update from one of the clients 106. Correspondingly, a client 106 may send a volume update associated with one or more server media applications 206. Upon receipt of such an update, the remote audio session monitor 108 updates the server audio stack to set a new state for the audio session parameters (e.g. volume) for the audio session. The state of the audio session parameters is utilized to implement the volume change for the server application 206. The server 102 may further include other modules 210 to facilitate execution of the server media applications 206 and to provide a server-client interface.

The server computing device 102 includes a network interface 212 to enable communication with the clients 106 through the network 104.

Exemplary Client Computing Device

Figure 3:
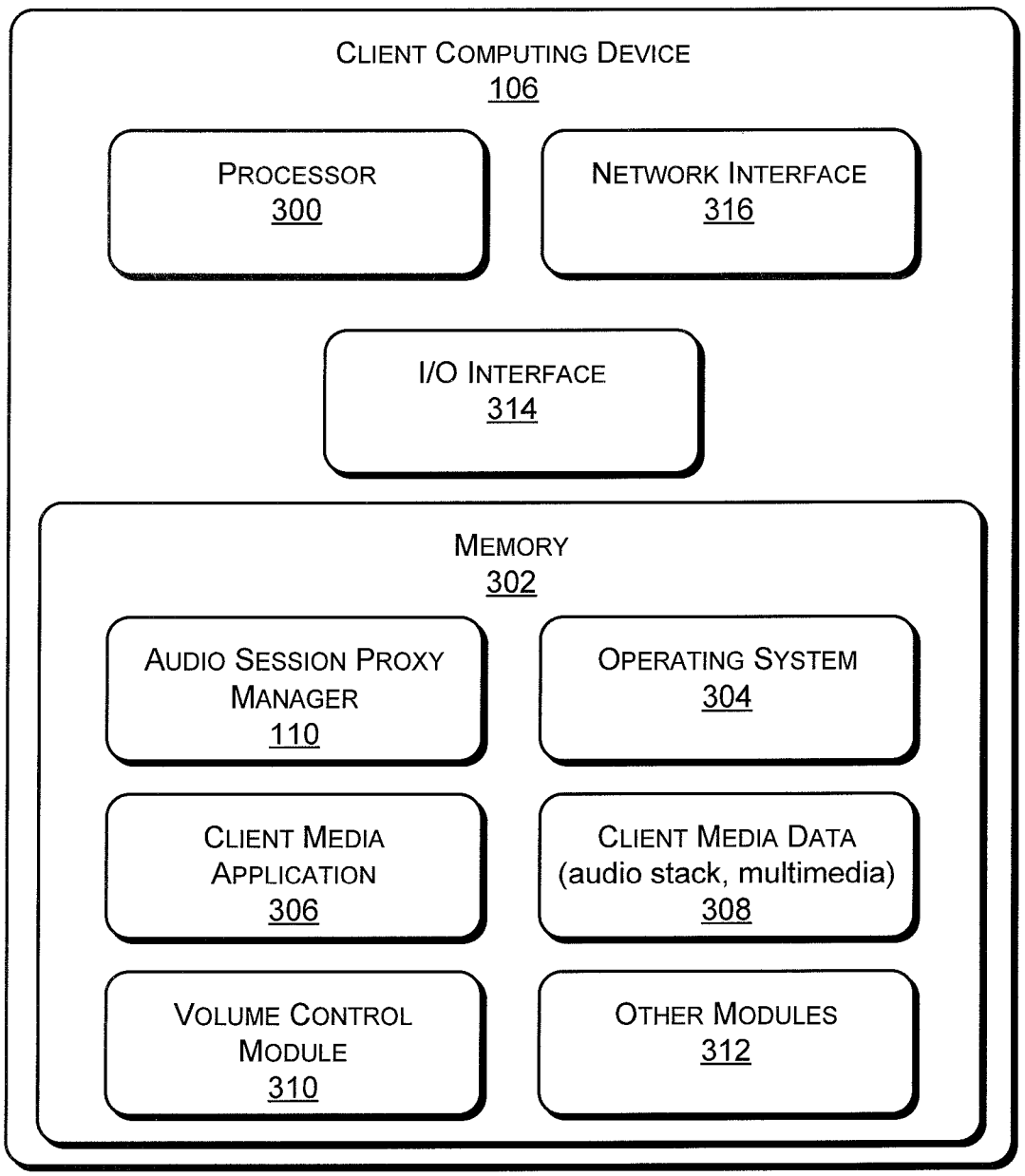
FIG. 3 illustrates an exemplary embodiment of a client computing device for per-application remote volume control.

FIG. 3 shows an implementation of a client computing device or client 106 for per-application remote volume control. To this end, the client 106 includes one or more processor(s) 300 coupled to a memory 302. Such processor(s) 300 could be for example, microprocessors, microcomputers, microcontrollers, digital signal processors, central processing units, state machines, logic circuitries, and/or any devices that manipulate data based on operational instructions. The processor(s) 300 are configured to fetch and execute computer-program instructions stored in the memory 302. Memory 302 includes computer-readable media in the form of volatile memory, such as Random Access Memory (RAM) and/or non-volatile memory, such as Read Only Memory (ROM) or flash RAM or a combination thereof. The memory 302 may include an operating system 304 that provides a platform for execution of one or more client applications on the client 106. Such client applications may include, for example, client media applications 306. It may be noted that client media applications 306 include, for example, Windows Media Player, Media Center, VLC Media Player, Winamp Player, DivX Player, Real Player, DSS Player, and other similar Media players.

In this exemplary implementation, the memory 302 includes the audio session proxy manager 110 that receives remote audio session notifications from the remote audio session monitor 108. The audio session proxy manager 110 utilizes the remote audio session notifications to create a proxy audio session at the client 106. The proxy audio session corresponds to the server media application 206 executed upon a request from the client 106.

Subsequent to the creation of the proxy audio session, a local audio session notification is fired by a client audio stack in the client 106. The local audio session notification invokes a user interface to present a volume slider on the client 106. The volume slider may be utilized by a user of the client 106 to increase or decrease the volume of the application running on the server 102.

A set of audio session parameters associated with the remote audio session notification is stored in client media data 308. The audio session parameters may include, for example, volume, title, changes in volume and title, audio file extension, icon for visual display, and compression standards, etc. The client 106 maintains a client audio stack in the client media data 308 to set/store states corresponding to the audio session parameters.

In one of the configurations, remote audio session notifications corresponding to a change in volume (volume change notifications) of server media application 206 may be communicated to the audio session proxy manager 110. The audio session proxy manager 110 acts upon a received remote audio session notifications (volume change notification) to reflect a corresponding change in the volume at the client device 106. Such remote audio session notifications for volume change results in change of state of various audio session parameters stored in the client audio stack.

In yet another aspect, there may be multiple media applications running concurrently on the server 102. For example, windows media player, VLC Media player, Winamp, etc. may be executed at the server 102 simultaneously. Accordingly, the server audio stack stores state(s) of audio session parameters corresponding to respective media applications. In such a case, the remote audio session monitor 108 may be configured to notify the audio session proxy manager 110 about changes in volume of individual media applications. In an embodiment, the changes in the volume, if any, are implemented by changing/modifying the state of the corresponding audio session parameters. The server audio stack, upon detecting a change in the volume of one or more server media application(s) 206, sends a local volume change notifications for respective volume changes.

The remote audio session monitor 108 receives the local volume change notifications from the server audio stack and sends a remote volume change notification to the audio session proxy manager 110. Subsequently, the audio session proxy manager 110 receives the remote volume change notification and changes the volume in the corresponding proxy audio session. The volume change notification received by the audio session proxy manager 110 results in change of state of audio session parameters stored in the client audio stack. The audio session proxy manager 110 acts on the updated audio session parameters to implement a similar change in volume of the server media application 206 at the client 106.

In yet another embodiment, a user interface may also be implemented on the client 106 to remotely control the volume of the one or more server media applications 206 running on the server 102. This may be accomplished by a volume control module 310 which presents a user interface on the client 106. A user interface provides for one or more volume sliders to control the volume of individual server media application 206 being executed at the server 102. The user may selectively change the volume of one or more server media application(s) 206 by sliding the volume slider for the corresponding application. Such a change in the volume is instantaneously implemented on the client 106 and states of corresponding audio session parameters are changed. The change in state of one or more audio session parameters is notified to the audio session proxy manager 110 by way of local volume change notification.

Subsequently, the audio session proxy manager 110 sends a volume update to the server 102 to update the states of the corresponding audio session parameters in the server audio stack. Such an update is send as a remote volume change notification which is received by the remote audio session monitor 108. The remote audio session monitor 108 sets volume(s) for the one or more server media application(s) 206 to which the changes in volume are applicable. Accordingly, the new volume for the audio session is reflected in the server audio stack by updating the audio session parameters. It may be appreciated that each server media application 206 will have associated with it, a set of audio session parameters. The remote volume change notification may correspond to change in volume of one or more server media applications 206. In a successive progression, the remote audio session monitor 108 updates/changes the state of each of the set of audio session parameters associated with the one or more server media applications 206.

In an exemplary embodiment, the remote audio session monitor 108 and the audio session proxy manager 110 enable synchronization of audio session parameters between the server 102 and the client 106. As described above, the audio session parameters for a server media application 206 may be stored in the server audio stack and the client audio stack respectively during an active audio session. In yet another implementation, the remote audio session monitor 108, and the audio session proxy manager 110 may be configured to synchronize the audio session parameters for one or more audio sessions between the server 102 and the client(s) 106.

The memory 302 further includes other module(s) 312 that implement modules for providing the user interface. In an exemplary embodiment, the user interface may be a per-application volume interface provided in an operating system. The client computing device 106 includes a network interface 314 to enable communication with the server computing device 102 through the network 104.

Exemplary Methods

Exemplary methods for per application volume control are described with reference to FIGS. 1 to 3. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
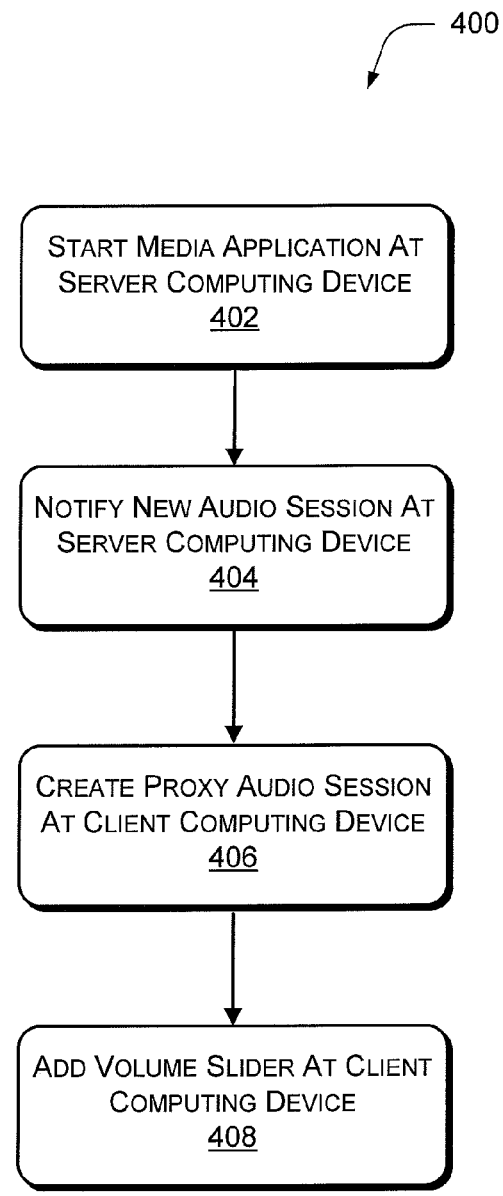
FIG. 4 illustrates an exemplary method for creating an audio session between a server computing device and a client computing device.

FIG. 4 illustrates an exemplary method 400 for creating an audio session between a server computing device (server) and a client computing device (client). The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 402, a media application is initiated at the server 102. In an implementation, the client 106 provides a request to execute server media application 206 on the server 102. Upon receipt of such a request, an audio session is instantiated. Correspondingly, states of various audio session parameters are stored in the server audio stack implemented in server media data 208. The server audio stack sends a local audio session notification to the remote audio session monitor 108. In another implementation, the request for execution of the server media application 206 may be provided by way of selecting an application from a client-server interface. It may be appreciated that various methods known in the art may be employed to initiate the execution of the server media application 206 on the server 102.

At block 404, the new audio session is notified at the server 102. The remote audio session monitor 108 receives the local audio session notifications from the server audio stack and gathers required information for the corresponding audio session. The gathered information is forwarded as a remote audio session notification to the audio session proxy manager 110 implemented in the client 106. The information may include the audio session parameters, such as, session title, volume, changes in the title and volume, icon for visual display, etc.

At block 406, a proxy audio session is created at the client 106. In particular, the audio session proxy manager 110 receives the remote audio session notification from the remote audio session monitor 108 and subsequently creates a proxy audio session at the client 106. The audio session proxy manager 110 stores the received audio session parameters in the client audio stack.

At block 408, a volume slider is added at the client 106. In succession to the creation of a proxy audio session at block 406, a new local audio session is created at the client 106. The creation of the new local audio session is followed by a local audio session notification to a user of the client 106. In one of the implementations, the new audio session invokes a volume control module 310 to present a volume slider for individual server media applications 206 being executed at the server 102. The volume slider may be utilized by a user of the client 106 to increase or decrease the volume of the respective application running on the server 102.

Figure 5:
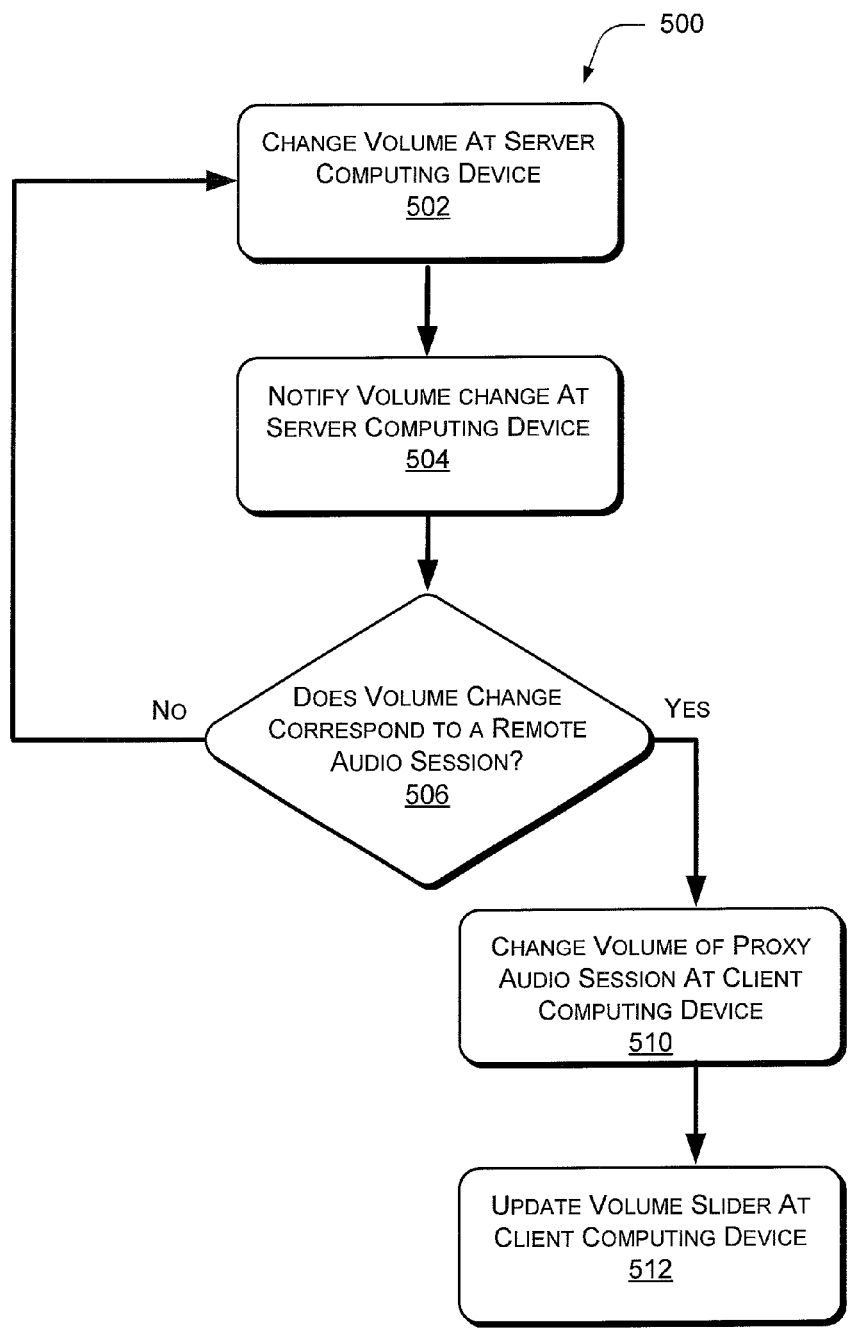
FIG. 5 illustrates an exemplary method for synchronizing volume changes from server computing device to client computing device.

FIG. 5 illustrates an exemplary method 500 for synchronizing volume changes from server computing device (server) to client computing device (client). The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 502, the volume of the media application running at the server 102 is changed. In an exemplary implementation, the user accesses the server 102 and changes the volume associated with the server media application(s) 206. The changes in volume corresponding to respective media applications are stored in the server audio stack along with relevant information for the associated audio session.

At block 504, the change in the volume as in block 502 is notified to the server 102. For example, the volume change stored in the server audio stack is retrieved and forwarded to the remote audio session monitor 108. Alternatively, the server audio stack sends a local volume change notification to the remote audio session monitor 108.

At block 506, it is determined whether, the volume change notification corresponds to a remote audio session between the server 102 and the client 106. In one of the implementations, the remote audio session monitor 108 determines whether the volume change notification is applicable to an active remote audio session corresponding to the server media application 206. If the volume change notification is applicable to a remote audio session, block 508 is executed; else block 502 may be executed. It may be noted that the "no" branch of the block 506 may correspond to a no operation process. Accordingly, the remote audio session monitor 108 may ignore a local volume change notification if it is not applicable to a remote audio session. In an alternative implementation, a message may be displayed to report a failure in finding the remote audio session.

At block 508, upon finding a corresponding remote audio session, the volume of the proxy audio session at the client 106 is changed. In an exemplary implementation, the remote audio session monitor 108 utilizes the local volume change notification of block 504 to remotely notify the client 106 about the volume change. Such a remote volume change notification is received by the audio session proxy manager 110. Accordingly, the client audio stack updates the state of one or more audio session parameters based on the remote volume change notification.

At block 510, the volume slider at the client 106 is updated. In an exemplary implementation, the volume control module 310 updates the volume slider based on the state of the one or more audio session parameters stored in the client audio stack.

Figure 6:
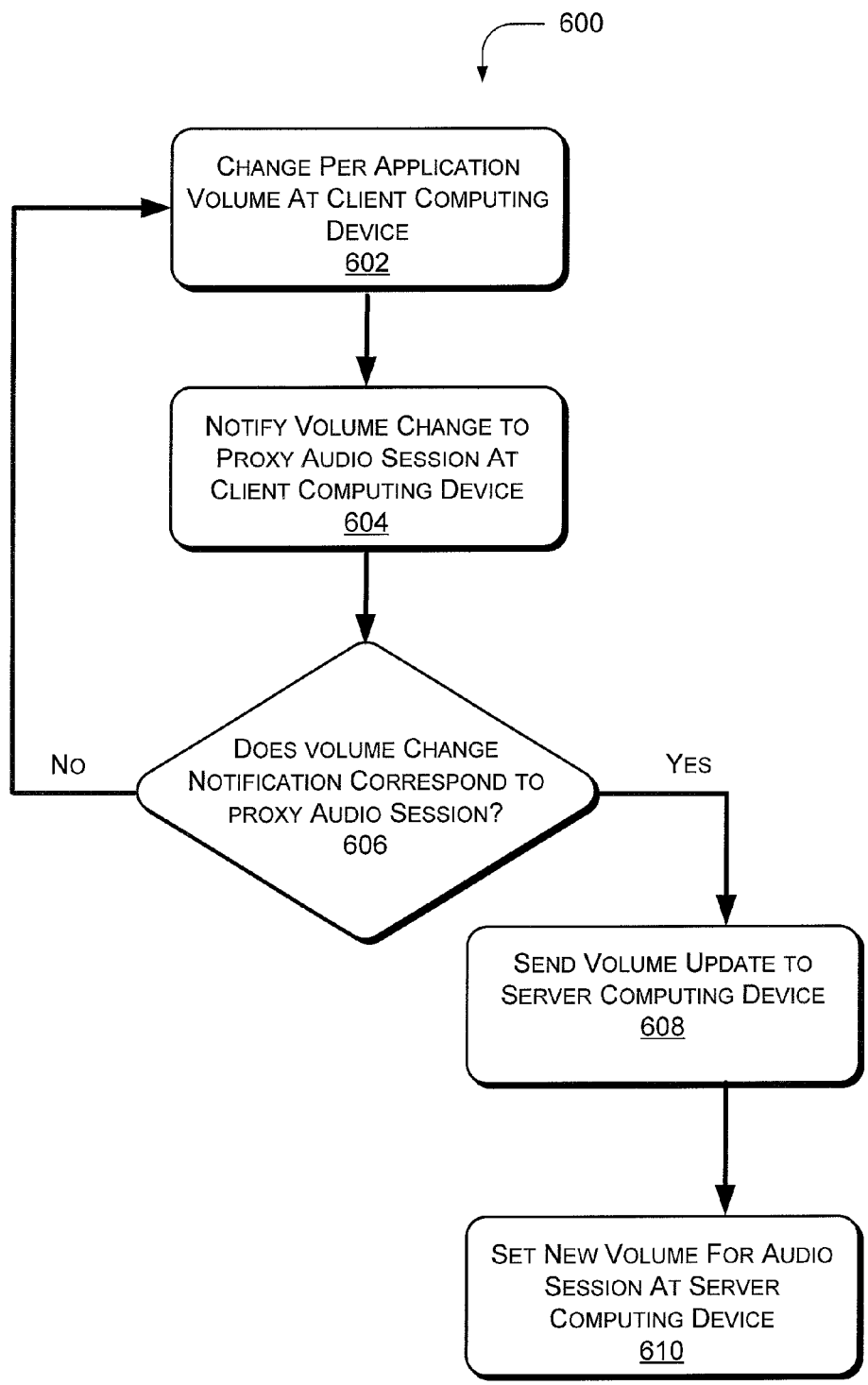
FIG. 6 illustrates an exemplary method for synchronizing volume changes from client computing device to server computing device.

FIG. 6 illustrates an exemplary method 600 for synchronizing volume changes from client computing device to server computing device. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 602, per-application volume is changed at the client 106. In an exemplary illustration, a user may selectively change the volume of individual server media application(s) 206. This is accomplished by presenting a user interface to the user at the client 106. The user interface provides for one or more volume sliders to control the volume for individual media applications executed at the server 102. The user changes the volume of one or more media applications by sliding the volume sliders for the corresponding application. Such volume changes results in a change of state of a set of audio session parameters stored in the client audio stack.

At block 604, the volume change of block 602 is notified at the client 106. In an implementation, the client audio stack sends a local volume change notification to the audio session proxy manager 110. The audio session proxy manager 110 utilizes the local volume change notification from the client audio stack for remotely controlling the per-application volume of server media application(s) 206.

At block 606, a determination is made as to, whether the local volume change notification corresponds to a proxy audio session or a local audio session. Appropriately, audio session proxy manager 110 determines whether the local volume change notification of block 604 is applicable to a proxy audio session (remote audio session). As described with regard to the exemplary systems, the audio session proxy manager 110 presents a proxy media window to emulate an interface of a remote server media application 206 at the client 106. In a case when the local volume change notification is applicable to a proxy audio session, block 608 is executed else the control may be directed to block 602. Alternatively, the "no" branch of the block 606 may also correspond to a case where the volume change notification is applicable to a local audio session at the client 106. In a successive progression, the volume change is reflected in the media window corresponding to a local audio session. In such a case, the audio session proxy manager 110 ignores the local volume change notification with regard to server media applications 206.

At block 608, a volume update is sent to the server 102. In particular, the audio session proxy manager 110 sends a volume update to the remote audio session monitor 108. Such an update corresponds to change in audio session parameters due to the change in volume as stored in client audio stack at block 602. In an exemplary implementation, the audio session proxy manager 110 sends a remote volume change notification to the remote audio session monitor 108 to notify the server 102 about the volume changes of block 602.

At block 610, a new volume for the remote audio session is set at the server 102. In particular, the remote audio session monitor 108 receives the remote volume change notification and sets a new volume for the corresponding server media application 206. Correspondingly, the new volume may result in changing of one or more audio session parameters stored in the server audio stack.

CONCLUSION

The above-described methods and computer describe per-application remote volume control. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computing device comprising:
a memory;
one or more processors operatively coupled to the memory; and
an audio session proxy manager stored in the memory, wherein the audio session proxy manager receives an audio session notification, the audio session proxy manager being associated with a first application and a second application, and wherein the audio session proxy manager receives information that the first application and the second application are being executed simultaneously at a remote server, the first application and the second application being actively remoted on the computing device, the audio session proxy manager being configured to receive a volume change notification from the remote server, wherein the volume change notification is associated with at least one of the actively remoted first application and the actively remoted second application, and the audio session proxy manager being configured to apply a volume change identified in the volume change notification to the actively remoted first application and not apply the volume change identified in the volume change notification to the actively remoted second application when the volume change identified in the volume change notification is associated with the actively remoted first application.

2. The computing device of claim 1, wherein the audio session notification is used to create a proxy audio session at the computing device.

3. The computing device of claim 2, wherein the proxy audio session corresponds to a remote media application.

4. The computing device of claim 1, wherein the audio session proxy manager stores a set of audio session parameters that include one or more of the following: volume, title, changes in volume or title, audio file extensions, icon for visual display and compression standards.

5. The computing device of claim 1, wherein the audio session proxy manager receives a volume change notification from a corresponding audio session at the remote server.

6. The computing device of claim 1 further comprising a user interface to change volume of a remote application.

7. A method comprising:
receiving information of an instantiation of an audio session at a remote server, wherein the instantiation of the audio session is specific to an application resident on the remote server;
establishing a proxy audio session at a client based on the received information; and
sending received volume changes on the proxy audio session to the remote server, wherein at least one of the received volume changes is applied to an active first sound-producing application resident on the remote server and being remoted on the client and is not applied to a second sound-producing application resident on the remote server and being remoted on the client, wherein the first sound-producing application and the second sound-producing application are simultaneously active and are resident on the remote server, and wherein the at least one of the volume changes is applied to an audio stack of the client prior to sending information about the at least one of the volume changes to an audio stack of the remote server.

8. The method of claim 7, wherein the instantiation of the audio session is performed from a client-server interface resident at a client.

9. The method of claim 7, wherein the receiving information includes receiving an audio session notification.

10. The method of claim 7 further comprising providing a volume control at the client for the application resident at the server.

11. The method of claim 7 further comprising applying the volume changes at the remote server.

12. A method comprising:
changing a volume level of a remote application resident on a server, the changing the volume level of the remote application resident on the server being application-specific and not affecting the volume level of a second application resident on the server;
determining whether an active remote audio session exists between the server and a remote client that corresponds with the remote application; and
providing a volume change notification to a proxy audio session on the remote client when the active remote audio session is determined to exist, the volume change notification being specific to the remote application and identifying a volume change for the remote application and not affecting the volume of the second application when the remote application and the second application are simultaneously executed and are remoted to the remote client.

13. The method of claim 12, wherein the changing is performed through a user interface.

14. The method of claim 12, further comprising registering the volume change notification associated with the remote application.

15. The method of claim 12, wherein the changing includes notifying an audio session monitor about change in volume.

16. The method of claim 12, wherein the determining applies to the changing volume of the remote application.

17. The method of claim 12, wherein the determining is performed by an audio session monitor.

18. The method of claim 12, wherein the providing further comprises updating a volume slider associated with a proxy audio session.

19. The method of claim 12 further comprising providing an error message if determining shows that an audio session does not exist.

20. The method of claim 19 further comprising recursively determining whether an audio session exists, until an audio session is found.

* * * * *